Dec. 13, 1955  W. H. DE GREE  2,726,403

FLUSH VALVE

Filed Jan. 25, 1954

INVENTOR.
Wilmar H. DeGree
BY H. W. Brelsford
ATTORNEY

United States Patent Office 2,726,403
Patented Dec. 13, 1955

2,726,403

FLUSH VALVE

Wilmar H. De Gree, Santa Barbara, Calif.

Application January 25, 1954, Serial No. 405,859

1 Claim. (Cl. 4—57)

My invention relates to toilet flush valves and has particular reference to a pivoted valve of high repetitive seating accuracy having positive seating.

Numerous attempts have been made to construct toilet flush valves that are positive in operation. Innumerable patents of all conceivable types have been issued on flush valves, and many hundreds of different commercial structures have been introduced from time to time on the market over the past decades. The fact remains that there is today no satisfactory flush valve that is positive in operation. Most flush valves seat positively and seal correctly when first new, but as the rubber valve element softens or the valve seat becomes coated or corroded, the valve starts to leak, resulting in irritating noise as well as serious economic water loss.

I have developed a valve that has proved to be positive in seating operation over months of actual use and testing. My valve structure employs a valve seat that is inclined to the horizontal by a small acute angle. The movable valve element may be the conventional rubber construction, but I provide positive seating by mounting this valve element on a pivoted arm. Furthermore, this arm is pivoted at well separated points along the pivot axis so that there will be no wobble as the arm swings on its pivot. I provide a separate actuating member for the pivot arm so that there will be no direct pull or pressure on the arm itself from the manual actuator thus preventing displacement of the pivot arm. While each of these various elements of structure may seem relatively unimportant in themselves, the overall effect is very remarkable in that positive seating and sealing is maintained over many months of operation.

It is therefore an object of my invention to provide an improved toilet flush valve.

Another object is to provide a toilet flush valve having an inclined seat cooperating with a valve element mounted on an inflexible and solidly journaled pivot arm.

A further object is to provide a flush valve with the movable valve element mounted on a pivot arm wherein the pivot arm is indirectly actuated by manual efforts.

Other objects and advantages of the invention will be apparent in the following description and claim considered together with the accompanying drawings in which:

Figure 1:
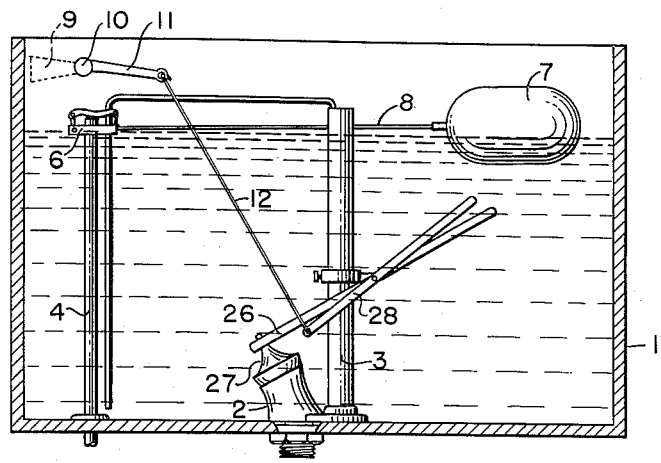
Fig. 1 is an elevation view, partly in section, of a toilet flush tank having a valve incorporating my invention.

Referring to Fig. 1 there is illustrated part of a flush toilet including a flush tank 1 having a flush pipe 2 provided particularly in accordance with my invention and which pipe may communicate with a toilet bowl (not shown). Communicating with the flush pipe 2 may be an upright overflow tube or pipe 3. Water is supplied to the flush tank 1 through a pipe 4 which may have a valve 6 mounted on its upper end controlled by a float 7 connected to the valve 6 by means of the usual rod or lever member 8. The tank 1 may also be provided with a manual flush handle 9 which may be attached to a shaft 10 which in turn rotates a flush lever 11. The flush lever 11 may be connected by a chain or wire 12 to my valve operating mechanism.

Referring now to all of the figures it will be noted that the flush pipe 2 may have an upright projecting section 13 above an attachment section 14 which may terminate in external threads 16. A rubber gasket 17 may fit over this attachment section 14 and the entire pipe 2 may be secured in the flush tank as shown in Fig. 1 by tightening a nut 18 against this gasket 17. The pipe 2 may also have a lateral hollow lobe 19 which may receive the overflow pipe 3 to communicate it with the interior of the flush pipe 2.

The upper end or flush tank end of the flush pipe 2 is formed particularly in accordance with my invention and a valve seat 21 may be formed on the interior surface of the upper end. This valve seat is disposed in a plane at an acute angle with a horizontal surface or plane and I have found that this angle is very important to proper functioning of the valve. This angle is designated in Fig. 3 with the letter A and I prefer to have this angle at 30 degrees. However, an angle as great as 40 degrees will nevertheless give the benefits of my improved valve and while I prefer greater angles, this angle may also be as small as 15 degrees. The valve seat itself is preferably finished to a smooth surface so that there will be positive sealing.

Figures 2, 3:
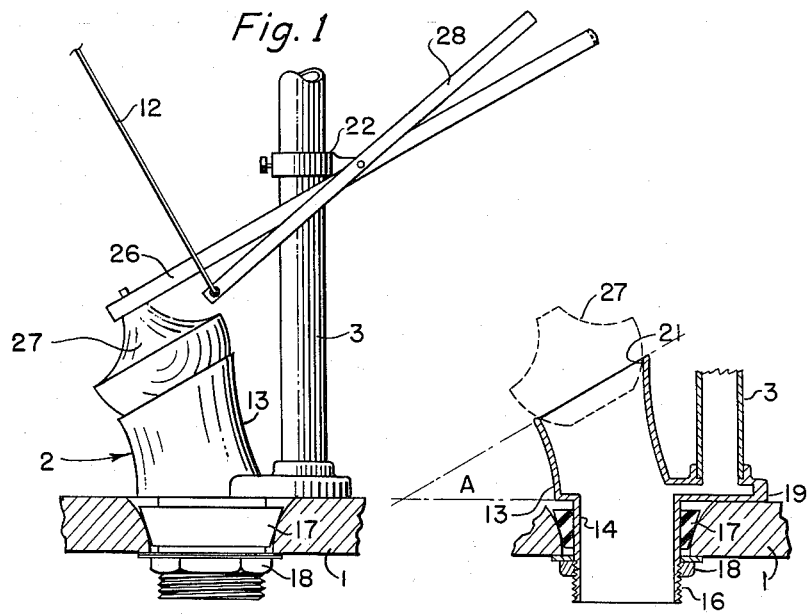
Fig. 2 is an enlarged elevation view of the valve mechanism of Fig. 1.
Fig. 3 is a sectional view of the flush pipe and overflow pipe of Fig. 2.
Figure 4:
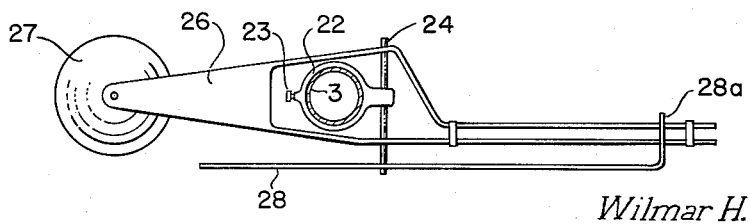
Fig. 4 is a plan view of the valve mechanism of Fig. 2.

Referring particularly to Figs. 2 and 4 it will be noted that a bracket 22 may be mounted on the overflow pipe 3. This bracket is normally free to slide up and down on the overflow pipe 3 and the bracket may be secured in its proper position by means of a thumb screw 23 which may be tightened with tools if desired. Projecting transversely to the overflow pipe 3 and securely mounted on the bracket 22 may be a pin 24 of appreciable length. While this pin may be free to rotate in an accurately bored hole in bracket 22 I prefer to have it rigidly mounted on the bracket 22 as by a close fit in the bore or soldering or by other means.

Mounted for pivotal action on the pin 24 may be a pivoted valve arm 26 which projects a substantial distance both sides of the pin 24. The construction of this arm is important in that it must be free of wobble and other misalignments commonly found in the ordinary flush tank mechanisms. For this purpose I construct the arm 26 of a triangular shape so that it has two points of attachment or mounting on the pin 24. This is accomplished by means of two vertical diverging members as illustrated preferably of sheet metal bored to the approximate diameter of the pin 24. While I prefer to have the distance between these two points of mounting approximately two and one-half or three inches the benefits can be derived by a dimension as low as one and one-half or possibly one inch. If, however, the pin projects past opposite sides of the overflow pipe 3 the dimension between these mounting points must be substantial in order to pass around this overflow pipe.

Mounted on the pointed end of the triangular shape of the valve arm 26 may be a movable valve element 27 which may be of the conventional shape or construction if desired, namely of hollow rubber construction.

The actuating mechanism for my valve is also provided particularly in accordance with my invention and is so designed as to remove direct pulling forces from the valve arm 26. This actuating mechanism may include an auxiliary actuating lever 28 which may be pivoted at any desired point, for example, on the pin 24. One end of the lever 28 may be bent as at 28a to overlie the upwardly projecting end of the valve lever 26. The actuating link 12 may be connected to the lower end of the actuating member. When the link 12 is pulled upwardly the overlying end 28a engages the valve arm 26 and causes it to lift the movable valve element 27 off of its seat 21 so that fluid may rush from the tank 1 through the flush tube 2 to flush the toilet bowl. In operation water fills the tank 1 from the tube 4 as controlled by the valve 6. When the tank is full as illustrated in Fig. 1 the float 7 will shut off the valve 6. When it is desired to flush the toilet the operator manually grasps the handle 9 rotating it counterclockwise in Fig. 1 which in turn causes the actuating arm 28 to engage the valve arm 26 to cause it to rotate in a clockwise direction. This in turn causes the valve element 27 to lift off of the seat 21 permitting water to flow through the flush tube 2. When the water is exhausted from the tank 1 the valve element 27 will seat positively and accurately upon its seat 21 because of the wide mounting of the lever 26 on the pin 24. Manual pull on the lever will not misplace it or misalign it because the unseating effort is indirectly applied through the actuating lever 28. Disposing the valve seat 21 at a substantial acute angle is illustrated to improve the seating action on the valve seat 21 as contrasted to a horizontal valve seat.

While I have shown and described a presently preferred embodiment it will be appreciated that various modifications could be made therein without departing from the true spirit and scope of the invention. My valve has proved to be positive in action and reliable over many months of operation and the various parts contribute importantly to the final result, namely, a valve that does not leak even after months of operation.

I claim:

In a flush toilet having a tank, a bowl, a flush pipe connecting the tank and the bowl, an overflow pipe communicating into the flush pipe and extending upwardly within the tank, and an operating handle, a valve mechanism for the flush pipe comprising: a valve seat formed on the flush tank end of the flush pipe and disposed in a plane having an angle of 15 degrees to 40 degrees with horizontal; a bracket engaging the overflow pipe and adapted to slide up and down on the overflow pipe; a screw carried by the bracket and adapted to engage the overflow pipe to secure the bracket thereon at any desired point; a pivot pin securely mounted in the bracket; a triangular valve arm pivoted on the pin and engaging the pin at two points spaced at least one inch apart and the arm extending both sides of the pivot pin; a valve element rigidly mounted on the triangular apex of the valve arm and adapted to seat on the seat at one extreme of rotation of the valve arm, said valve being accurately positioned on the seat by adjustment of the bracket position on the overflow pipe; an actuating arm pivoted on the pin and having one end overlying the valve arm on the part projecting from the pin remote from the valve; and a connection to the handle from the other end of the actuating arm, whereby operation of the handle rotates the actuating arm which in turn actuates the valve arm to unseat the valve element and cause flow in the flush pipe.

References Cited in the file of this patent

UNITED STATES PATENTS

| | | |
|---|---|---|
| 416,132 | Weeden | Nov. 26, 1889 |
| 945,424 | Tilden | Jan. 4, 1910 |
| 1,079,036 | Tosco et al. | Nov. 18, 1913 |
| 1,201,416 | Ziemer | Oct. 17, 1916 |
| 2,190,160 | Mason et al. | Feb. 13, 1940 |
| 2,685,694 | Allison | Aug. 10, 1954 |